United States Patent [19]

Solowy

[11] 4,129,142
[45] Dec. 12, 1978

[54] SAFETY DEVICE FOR A RELIEF VALVE WITH A CONTROLLED DISK

[75] Inventor: Jean Solowy, Sens, France

[73] Assignee: FMC Corporation, San Jose, Calif.

[21] Appl. No.: 825,891

[22] Filed: Aug. 19, 1977

[30] Foreign Application Priority Data

Apr. 27, 1976 [FR] France .............................. 76 12451

[51] Int. Cl.² .................................................. F16K 17/19
[52] U.S. Cl. ........................................ 137/492; 137/495
[58] Field of Search ................................. 137/492, 495

[56] References Cited

U.S. PATENT DOCUMENTS

| 868,030 | 10/1907 | Tanner | 137/492 |
|---|---|---|---|
| 1,076,665 | 10/1913 | Collin | 137/492 |
| 3,592,224 | 7/1971 | Bois | 137/492 |
| 4,043,350 | 8/1977 | Ichimi | 137/495 X |
| 4,043,357 | 8/1977 | Gocke | 137/495 |

Primary Examiner—Harold W. Weakley
Attorney, Agent, or Firm—L. B. Guernsey; W. W. Ritt, Jr.

[57] ABSTRACT

A safety device especially for use with a relief valve having a disk which is controlled by a pilot valve. The safety device is connected between the pilot valve and the relief valve and provides means for closing the relief valve if the pilot valve should fail. The safety device includes a body mounted between the pilot valve and the disk of the relief valve. A spring biased cage mounted inside the body is kept in a locked position away from the disk until the pilot valve fails. Upon failure of the pilot valve the cage is unlocked and the spring presses the cage against the disk to close the relief valve.

7 Claims, 3 Drawing Figures

SAFETY DEVICE FOR A RELIEF VALVE WITH A CONTROLLED DISK

BACKGROUND OF THE INVENTION

1. Field of the Invention

This invention relates to valve safety devices, and more particularly to a safety device for use with a relief valve having a controlled disk type of closing member.

2. Background of the Invention

Relief valves are widely employed throughout many industries to relieve the pressure in containers such as storage tanks, boilers and pipelines to prevent damages to these containers due to excessive pressures. Some of the simpler relief valves employ a spring to bias a diaphragm over an opening to retain gas or fluid in the container until the inside pressure reaches a predetermined value, then allows the diaphragm to move away from the opening to relieve the excessive pressure. More accurate control of the value of inside pressure can be obtained by using a relief valve without a spring and employ a pilot valve to control the opening and closing of the diaphragm. Such a combination is disclosed in the U.S. Pat. No. 3,592,224 issued to Bois on July 1971, and a device of this type is diagrammatically shown in FIG. 1. Such a device affords many advantages, especially opening and closing of the valve corresponding to very precise pressure values, which may be very close to the predetermined opening value. Accordingly, it is desirable to substitute such types of valves for the spring biased valves in appliances where precision is of importance.

Nevertheless, owing to the number, the precision required and the fragility of the constituent parts, of such an apparatus, valves with a diaphragm-controlled disk are less robust than the spring biased valves, which are simpler, and the controlled disk valves have the characteristic of remaining open if the diaphragm happens to be pierced or else damaged.

Accordingly, it is an object of the present invention to provide a safety device for a controlled disk valve which enables, at least temporarily, such a valve to be put again in use, if for any reason its normal working is no longer ensured.

Particularly, it is another object of the present invention to provide a device which can be fitted on an existing diaphragm-controlled disk valve, in a simple way, which gives value to a previously existing material.

SUMMARY OF THE INVENTION

According to the present invention, there is provided a safety device comprising a body arranged to be mounted between the valve casing and the pilot valve, a spring biased cage movably mounted inside said body, means being provided for either keeping said cage in a locked position or allowing it to be moved under the pressure of the spring to a point where the cage engages the disk, said body being formed with a first passage communicating the inner space of the tank to the first outlet of the pilot valve, and with a second passage means connecting the inner space of the chamber to the outlet of the pilot valve, said second connecting means being kept closed when said cage is in its unlocked position.

Various objects, features and attendant advantages of the present invention will be more fully appreciated as the same becomes better understood from the following detailed description of the present invention when considered in connection with the accompanying drawings.

DESCRIPTION OF THE PREFERRED EMBODIMENT

Figure 1:
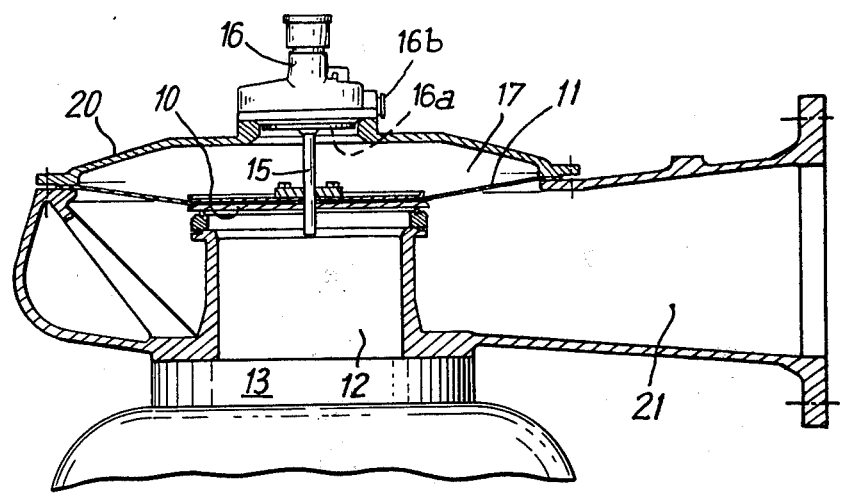
FIG. 1 is an axial cross sectional view of a conventional relief valve for a pressurized storage tank to be filled with a gas under pressure, with a pilot valve, on its upper part.

The safety valve of FIG. 1 comprises a disk 10 carried by a diaphragm 11. To ensure tightness, the disk is engaging a seat formed at the upper part of an inlet tube 12 communicating with a storage tank 13. The pilot valve 16 is fully described in the above mentioned U.S. patent and is equivalent to a three-way cock. The apparatus comprises a first passage formed by the tube 15 communicating with the inside of tank 13, this tube 15 passing through the disk 10 in a suitable fluid tight gasket means. The pilot valve 16 includes a second passage communicating with the chamber 17 through a port 16a (FIG. 3) at the lower part of the pilot valve, and a third passage leading through a port 16b to the open air. The pilot valve also provides for connecting chamber 17 either to the storage tank 13 through the tube 15 and port 16a or to the open air through another inner line connecting port 16a to port 16b, according to the pressure in the tank 13 and to the setting and adjustments of pilot valve 16.

When the inner space of chamber 17 is connected to storage tank 13, the fluid pressure in the tank, which is greater than atmospheric or air pressure, is applied against the under face of disk 10 and against the entire upper surface of the diaphragm 11. Atmospheric pressure is applied against the under surface of diaphragm 11, so that the diaphragm is biased downwards, and the disk 10 remains engaging its seat.

Figure 2:
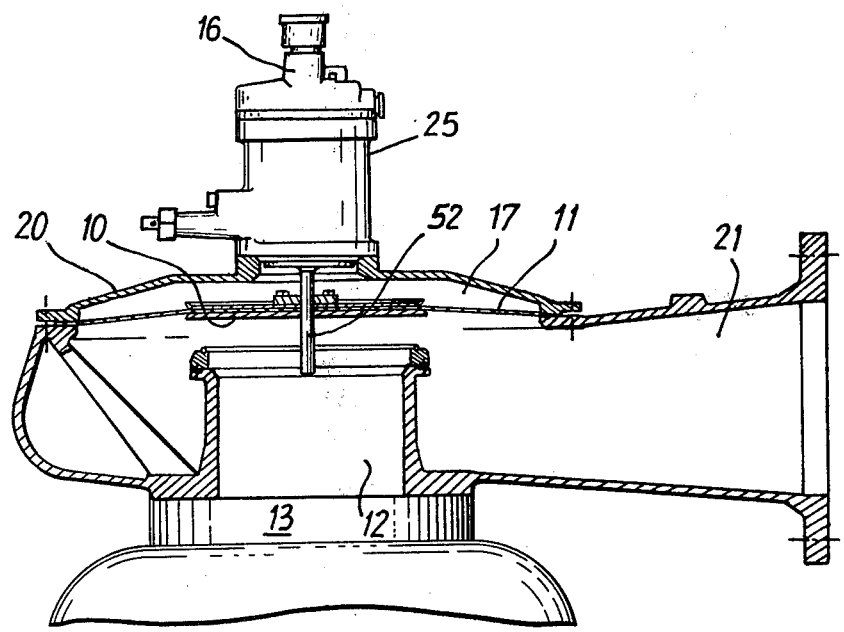
FIG. 2 is a similar view of the valve of FIG. 1, fitted with a device of the invention.

When the inner space of chamber 17 is connected to the open air, the air pressure is applied against the entire upper surface of diaphragm 11, and on the annular area of diaphragm 11. This difference in pressure causes the disk to move upwards and take the position as shown in FIG. 2. The inside of storage tank 13 is then communicating with the open air, through discharge collector 21, which may be connected to a funnel, a burner or other device. The pilot valve is still connected to tank 13 through tube 15, and when the tank pressure decreases the connections can be modified by the pilot valve. If the diaphragm happens to be pierced there is a permanent leakage, the pressure above said diaphragm is released and the disk can be moved upwards and the valve remains open. It is a primary object of the present invention to remedy to this situation, and the invention provides a safety device 25, generally shown in FIG. 2 and described more in detail hereinafter in connection with FIG. 3.

Figure 3:
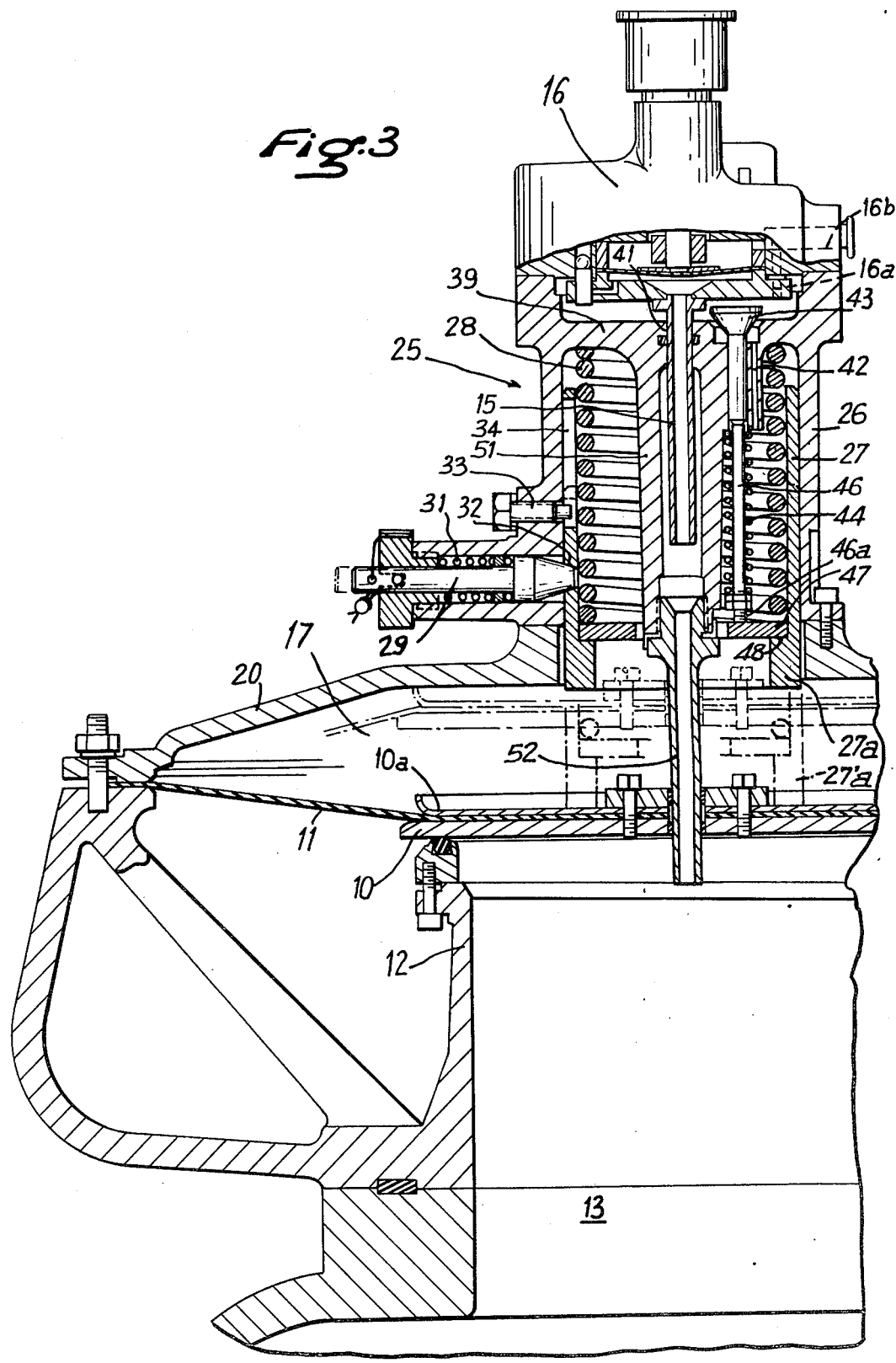
FIG. 3 is a schematic cross-sectional view to a greater scale of the device according to the invention.

The device is shown as comprising a cylinder body 26 disposed between valve casing 20 and the pilot valve 16, preferably with the same connecting means as those enabling valve 16 to be connected to valve casing, so as to allow insertion on a valve already in use with a pilot valve. An inner movable cylinder cage 27 is slidably mounted inside body 26, and is spring loaded towards disk 10 by a compression spring 28, so as to allow the peripheral lower edge 27a to come and engage the disk 10a, in the position 27'a indicated in phantom lines. In this position, it is to be seen that spring 28 acts as a setting means and its characteristics are chosen accordingly. When the safety device is not in use, it is maintained in its upper position with the spring compressed, by a locking pin 29 biased radially inwardly by a spring 31 into a hole 32 provided in the inner movable cage 27. A screw 33 having a reduced end portion thereon projects into a longitudinal slot 34 to prevent the cage 27 from rotating and thus ensures that the hole 32 is adjacent the end of the locking pin 29. The body 26 is closed at its upper end by a wall 39 having a first opening 41, for the tube 15 of the pilot valve and having a second opening of a passage 42 allowing port 16a to communicate with chamber 17 through the body 26. The passage 42 can be closed by an inner valve closing element 43, biased downwardly by a spring 44. The lower end 46a of valve rod 46 engages an annular plate 47 disposed on a step 48 formed in the lower end of the movable cylinder case 27. The opening 41 is connected to a tube 51, which in turn is connected to a tube 52 passing through the disk 10 in the opening provided for tube 15. Suitable gasket means are disposed in proper places as shown in FIG. 3.

The operation of the device is as follows. When diaphragm 11 is in good condition, the valve 20 operates normally and is controlled by the pilot valve 16, the tube 15 of which is continued by tubes 51 and 52 through disk 10 to the inner space of storage tank 13. The safety device 25 is in the condition as shown in FIG. 3, with the movable cage 27 being maintained locked in its upper position by pin 29, and the spring 28 being compressed. The inner valve 43 remains open and establishes a passage for the gas from the pilot valve into the chamber 17, as the inner line in the pilot valve is connecting tube 15 to port 16a. If the pressure in tank 13 increases above a predetermined value, the pilot valve operates to connect chamber 17 to the open air through opening 42, the inner connections of the pilot valve and its port 16b. Everything operates just as if the safety device were not included.

If the diaphragm 11 should be damaged, for example, if it should be split or pierced, the fluid in chamber 17 is able to escape through discharge collector 21 to the atmosphere. Since the disk 10 is biased upward by the pressurized gas on its underside the disk 10 moves off the upper end of the tube 12 thereby allowing the gas from the tank 13 to escape into the air. To remedy this situation, one has to pull out pin 29, after having taken away the safety lead wire 29a if necessary. The pin may be pulled out either manually or by electrical or fluid means, either on the spot or by remote control. When the pin is removed the movable cage 27 is no longer locked and the spring 28 extends forcing the lower edge 27a of cage 27 against the disk 10a at position 27'a. The plate 47, biased by spring 28 within the cage 27 is moved downward so that the lower end 46a of rod 46 is no longer supported, thus allowing the closing member 43 to be moved downwardly by spring 44, into the position to close the opening 42. The valve is now operating as an ordinary spring biased valve and the pilot valve 16 is out of operation, since the passage 42 is closed. This device is connected to valve casing 20 only through tube 15, which can be connected only to port 16a, which opens in a closed space since passage 42 is closed by the inner valve 43. The valve 20 is allowed to operate as a spring biased valve until the diaphragm is repaired.

Quite evidently the device according to the invention may be put in use for any other failure of the pilot valve. As an example, the cage can be mounted in the following manner. Tube 52 is removed and a mandrel is moved into its place. It is possible to pull out this mandrel while a pressure is applied against the lower edge 27a of cage 27 with a suitable tool. The small end of screw 33 entering the slot 34 prevents the cage 27 from rotating and ensures that opening 32 will arrive in front of pin 29. The removable connection of tube 52 in the lower end of tube 51 makes this operation possible. Such a structure affords also the advantage of having parts of reduced length which are easier to manufacture.

Although a preferred embodiment is specifically illustrated and described herein, it will be appreciated that many modifications and variations of the present invention are possible in light of the above teachings and within the scope of the appended claims without departing from the spirit and intended scope of the invention.

What is claimed is:

1. A safety device for a relief valve of a pressurized fluid storage tank, of the type comprising a disk closing member carried by a diaphragm forming a wall of a chamber further limited by the valve casing, and a pilot valve forming a three-way cock, a first line being connected to said tank, a second line being connected to said chamber and a third line being connected to open air, so as to enable said chamber to be connected either to the inner space of the tank or to the open air, according to pressure inside said tank, characterized in that it comprises a body provided for being mounted between said valve casing and said pilot valve, a spring biased slidably movable cage inside said body, means being provided for either maintaining said cage in a locked position or allow it to be moved under pressure of said spring, the cage then engaging said valve disk, said body comprising a first communication means for connection of inner space of storage tank to the first line of said pilot valve, and a second communication means for connection of inner space of said chamber to the second line of said pilot valve, said second communication means being closed when said cage is in the unlocked condition.

2. A safety device according to claim 1 wherein said second communication means is formed by a passage through said body, within which is disposed a spring loaded valve, the valve rod of which is engaging a part of said cage when this latter is in locked position, so as to keep said spring loaded valve open.

3. A safety device according to claim 1 wherein said body is substantially a circular cylinder, said first communication means being an axial tube.

4. A safety device according to claim 3 wherein said axial tube is continued outside the body by a second tube, connected to the first tube by screw engagement.

5. A safety device according to claim 3 wherein the slidably movable cage has a substantially circular cylinder form, so as to be able of axially sliding in said body.

6. A safety device according to claim 5, wherein said means provided for maintaining the cage in a locked position is comprised of a pin substantially perpendicular to the axis of the cage, capable of entering a hole in the wall of said cage.

7. A safety device according to claim 4 further comprising means, such as screw with a smaller end portion passing through the body wall, cooperating with a slot formed in the cage wall, in order to prevent said cage from rotating in said body.

* * * * *